Patented Oct. 14, 1930

1,778,329

UNITED STATES PATENT OFFICE

FRANK B. MASON, OF NEW PROVIDENCE, NEW JERSEY, ASSIGNOR TO SWAN-FINCH OIL CORPORATION, OF NEW YORK, N. Y., A CORPORATION OF NEW YORK

CORE AND COMPOSITION FOR PRODUCING THE SAME

No Drawing. Application filed February 15, 1929. Serial No. 340,345.

This invention relates to cores and compositions for producing the same.

In cracking petroleum, when the cracked distillates are brought in contact with solid adsorbents such as fuller's earth, bentonite, clays, charcoal and the like, there is produced a liquid by-product. This by-product is known as "polymer" and when subjected to heat, air, or other oxidizing reagents, it forms a resinous product.

I have found that I can use this by-product as a binder in core-forming compositions and produce cores from the said compositions having properties comparable with, if not better than, the cores used prior to this invention. Due to the fact that polymer is a waste product, the cost thereof is relatively cheap and inexpensive, thus permitting a core to be formed which is much cheaper than the cores used prior to this invention.

It is, therefore, an object of this invention to provide a composition for forming cores which comprises a binder including polymer.

Another object of this invention is to produce a core having a binder including oxidized or polymerized polymer.

Additional objects will appear from the following description and appended claims.

Up to the present time core compositions have been produced from sea sand, silica sand, or the like mixed with a binder known as core oil. This binder was used in various amounts depending upon the article to be produced. It usually consisted of approximately 30% of a gum or resin, such as rosin, shellac, coumarone, resin, ester gum, etc., 20% to 55% of a drying oil or a mixture thereof, such as 5% to 40% linseed oil and 15% fish oil, and 15% to 50% of a diluent, such as kerosene. A composition so formed was processed into a core in the usual manner and then baked at a suitable temperature.

According to this invention, polymer is employed as the binder, thus forming a core composition comprising sea sand, silica sand or the like and a binder including polymer. The amount of polymer used in the composition is, as in the case of the usual core oil, dependent upon the casting to be produced. When a heavy or large casting is to be produced, I have found that 1 part of polymer to 20 parts of sand produces a satisfactory core. For light work I have found that satisfacory results are obtained when 200 parts of sand are used with 1 part of polymer. It is to be understood that proportions other than that specifically set forth may be used.

If desired, instead of making the binder wholly of polymer, the latter may be admixed with one or more of the ingredients comprising the binders used prior to this invention. Thus a binder may be formed from polymer admixed with a gum or resin, a drying oil or mixture thereof, with or without a diluent. In other words, the binder constituting this invention may comprise the usual binder in which all or any part of any or all of the ingredients is replaced by polymer.

The core composition is produced by thoroughly mixing sand with the binder in the usual manner. It is then formed into a core, as is well known in the art, and baked at a temperature of 400° F. or above until the polymer is resinified, oxidized or polymerized.

A core produced as above described possesses all the necessary properties and characteristics. It has the desirable tensile and breaking strength and the necessary porosity. Due to the fact that polymer is a waste or by-product, its cost is much less than the cost of the ingredients used in the binders prior to this invention and therefore, the cost of cores is materially reduced. Since a large number of cores is used, any reduction in the cost thereof results in a substantial saving.

I claim:

1. A composition for forming cores comprising a binder including polymer, said polymer being the liquid product resulting when cracked petroleum distillates are brought in contact with solid adsorbents.

2. A composition for forming cores comprising sand and polymer in the proportion of 20 to 200 parts of the former to 1 part of the latter, said polymer being the liquid product resulting when cracked petroleum distillates are brought in contact with solid adsorbents.

3. A composition for forming cores comprising sand, polymer, a drying oil, resin and a diluent, said polymer being the liquid product resulting when cracked petroleum distillates are brought in contact with solid adsorbents.

4. A composition for forming cores comprising sand, polymer, linseed oil, fish oil, rosin and kerosene, said polymer being the liquid product resulting when cracked petroleum distillates are brought in contact with solid adsorbents.

5. A core comprising sand and partially oxidized or resinified polymer, said resinified polymer being the product resulting when cracked petroleum distillates are brought in contact with solid adsorbents and subsequently oxidized.

6. A core comprising sand, resinified polymer, an oxidized drying oil and resin, said resinified polymer being the product resulting when cracked petroleum distillates are brought in contact with solid adsorbents and subsequently oxidized.

7. A core comprising sand, resinified polymer, linseed oil, fish oil and rosin, said resinified polymer being the product resulting when cracked petroleum distillates are brought in contact with solid adsorbents and subsequently oxidized.

8. A core comprising approximately 20 to 200 parts of sand to 1 part of resinified or polymerized polymer, said resinified polymer being the product resulting when cracked petroleum distillates are brought in contact with solid adsorbents and subsequently oxidized.

In testimony whereof, I have affixed my signature to this specification.

FRANK B. MASON.

3. A composition for forming cores comprising sand, polymer, a drying oil, resin and a diluent, said polymer being the liquid product resulting when cracked petroleum distillates are brought in contact with solid adsorbents.

4. A composition for forming cores comprising sand, polymer, linseed oil, fish oil, rosin and kerosene, said polymer being the liquid product resulting when cracked petroleum distillates are brought in contact with solid adsorbents.

5. A core comprising sand and partially oxidized or resinified polymer, said resinified polymer being the product resulting when cracked petroleum distillates are brought in contact with solid adsorbents and subsequently oxidized.

6. A core comprising sand, resinified polymer, an oxidized drying oil and resin, said resinified polymer being the product resulting when cracked petroleum distillates are brought in contact with solid adsorbents and subsequently oxidized.

7. A core comprising sand, resinified polymer, linseed oil, fish oil and rosin, said resinified polymer being the product resulting when cracked petroleum distillates are brought in contact with solid adsorbents and subsequently oxidized.

8. A core comprising approximately 20 to 200 parts of sand to 1 part of resinified or polymerized polymer, said resinified polymer being the product resulting when cracked petroleum distillates are brought in contact with solid adsorbents and subsequently oxidized.

In testimony whereof, I have affixed my signature to this specification.

FRANK B. MASON.

DISCLAIMER 1,778,329.—*Frank B. Mason*, New Providence, N. J. CORE AND COMPOSITION FOR PRODUCING THE SAME. Patent dated October 14, 1930. Disclaimer filed May 25, 1936, by the assignee, *Aristo Corporation*, and the non-exclusive licensee, *Swan-Finch Oil Corporation*.

Hereby enters this disclaimer to claims 1, 2, 3, 5, 6, and 8, of said patent.
[*Official Gazette June 23, 1936.*]

DISCLAIMER 1,778,329.—*Frank B. Mason*, New Providence, N. J. CORE AND COMPOSITION FOR PRODUCING THE SAME. Patent dated October 14, 1930. Disclaimer filed May 25, 1936, by the assignee, *Aristo Corporation*, and the non-exclusive licensee, *Swan-Finch Oil Corporation*.

Hereby enters this disclaimer to claims 1, 2, 3, 5, 6, and 8, of said patent.
[*Official Gazette June 23, 1936.*]